(12) United States Patent
Amin-Sanayei et al.

(10) Patent No.: US 6,586,547 B1
(45) Date of Patent: Jul. 1, 2003

(54) LOW CRYSTALLINITY VINYLIDENE FLUORIDE HEXAFLUOROPROPYLENE COPOLYMERS

(75) Inventors: Ramin Amin-Sanayei, King of Prussia, PA (US); Mehdi Durali, West Chester, PA (US)

(73) Assignee: ATOFINA Chemicals, Inc., Philadelphia, PA (US)

( * ) Notice: Subject to any disclaimer, the term of this patent is extended or adjusted under 35 U.S.C. 154(b) by 37 days.

(21) Appl. No.: 09/869,449

(22) PCT Filed: Nov. 3, 2000

(86) PCT No.: PCT/US00/30449
§ 371 (c)(1),
(2), (4) Date: Jun. 27, 2001

(87) PCT Pub. No.: WO01/32726
PCT Pub. Date: May 10, 2001

Related U.S. Application Data

(60) Provisional application No. 60/163,229, filed on Nov. 3, 1999.

(51) Int. Cl.$^7$ .................. C08F 214/22; C08F 214/28
(52) U.S. Cl. .................. 526/255; 526/250; 526/253; 526/254
(58) Field of Search .................. 526/255, 253, 526/254, 250

(56) References Cited

U.S. PATENT DOCUMENTS 4,569,978 A * 2/1986 Barber .................. 526/206
5,093,427 A * 3/1992 Barber .................. 525/276

* cited by examiner

*Primary Examiner*—Fred Zitomer
(74) *Attorney, Agent, or Firm*—William D. Mitchell

(57) ABSTRACT

New and novel copolymers of vinylidene fluoride and hexafluoropropylene having lower or no crystallinity together with processes for their manufacture and use are disclosed.

4 Claims, 3 Drawing Sheets

LOW CRYSTALLINITY VINYLIDENE FLUORIDE HEXAFLUOROPROPYLENE COPOLYMERS

Figure 1:
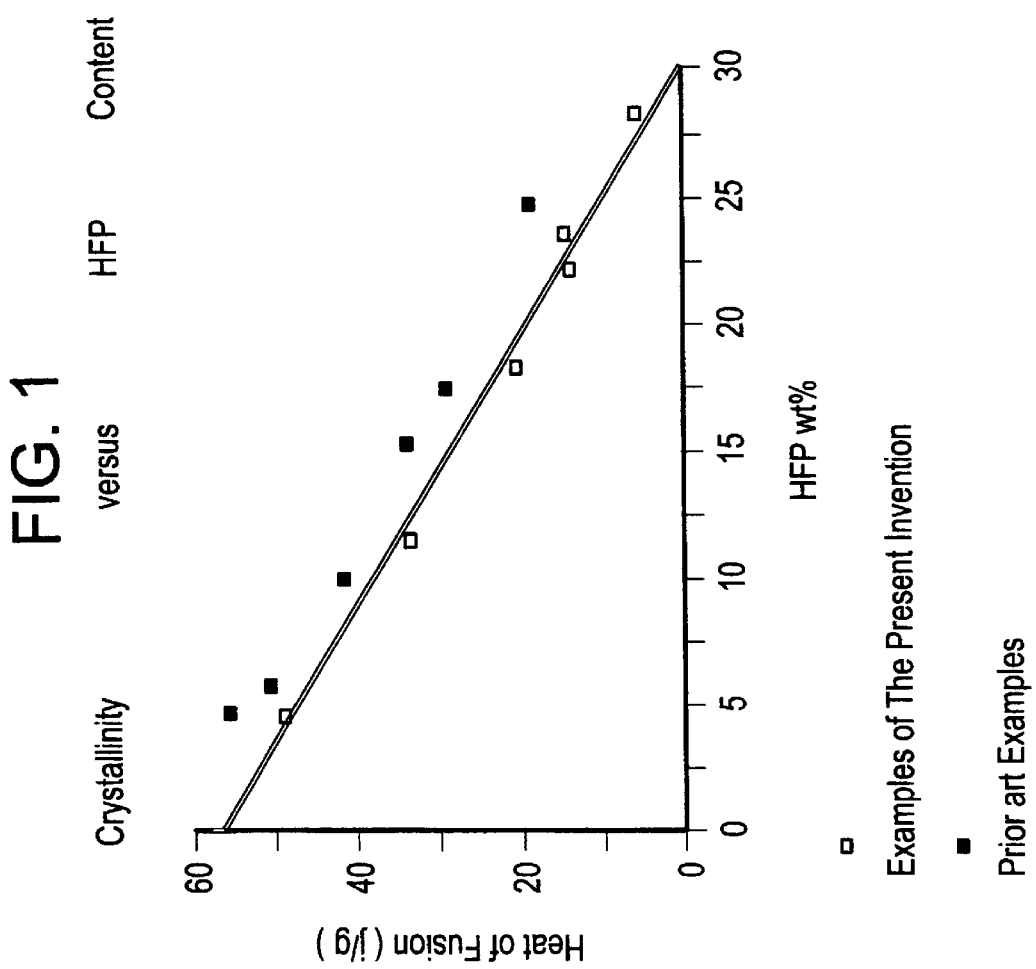

This application claims priority from Provisional Application No. 60/163,229, filed Nov. 3, 1999.

BACKGROUND OF THE INVENTION

This invention relates to compositions of matter classified in the art of chemistry as fluoropolymers, more specifically to copolymers of vinylidene fluoride (VDF) and hexafluoropropylene (HFP) and still more specifically to such copolymers having very low or no crystallinity and to processes for their preparation and use. The copolymers at all levels of HFP content remain highly flexible, thermoplastic copolymers which show low surface tack even at high HFP levels.

Fluoropolymers and copolymers of VDF, collectively VDF-based polymers wherein the VDF portion is greater than the total molecular percent of comonomers, are well known and widely used. Among the variety of fluoropolymers based upon tetrafluoroethylene, chlorotrifluoroethylene, and other speciality fluorine-containing monomers, the VDF polymers are unique offering the widest possible range of processing options to obtain articles having the beneficial attributes associated with improved chemical resistance and surface properties associated with the high concentration of carbon fluorine bonds. Thus, among the wide spectrum of fluoropolymers, the VDF polymers may be melted in typical processing equipment for thermoplastic resin for extrusion or molding or combinations such as extrusion-blown film and molding into tanks.

This versatility in processing options is related to the linear polymer chain structure and the presence of the highly polar-$CF_2$-groups alternating along the VDF polymer chain. The microstructure of the polymer chain and morphology of these polymers reflects these two factors in many interesting ways as described in Polymeric Materials Encyclopedia, 1996, Vol II, CRC Press; Vinylidene Fluoride-Based Thermoplastics (Overview and Commercial Aspects), J. S. Humphrey, pp. 8585 to 8588; Vinylidene Fluoride-Based Thermoplastics (applications), J. S. Humphrey and E. J. Bartoszek, pp. 8588–8591; Vinylidene Fluoride-Based Thermoplastics (Blends with Other Polymers), J. S. Humphrey and X. Drujon, pp. 8591–8593; Vinylidene Fluoride-Based Thermoplastics (Homopolymerization and Copolymerization), J. S. Humphrey and X. Drujon, pp. 8593–8596.

The balance between amorphous and crystalline regions, the nature and extent of the crystalline regions, and the interphase between these regions affects the mechanical properties significantly, and hence, the ultimate applications for a given resin composition.

At one end of the spectrum there are totally amorphous thermoplastic polymers and at the other S extreme the highly crystalline polymers. The microstructure of the polymer chain determines the flexibility (or alternately the stiffness) at a given temperature. This mechanical behavior is controlled by the type and amount of the crystalline phase (if any) and the dynamics of the molecular motion along the chain such that at some temperature the polymer undergoes a second order change in response to applied stresses, the so-called glass transition temperature (Tg). Above the Tg the polymer chain has molecular motions which are free to rotate, stretch, etc. and thereby absorb the energy input. Below the Tg the molecular motions are frozen and the stresses may lead to brittle fracture or glass-like behavior.

The immediate invention is concerned more with the morphology and crystalline/amorphous.ratio of the VDF polymers and the ultimate end uses. It is therefore important to understand the background of the present invention in the context of the teaching how crystalline and amorphous content fit into the range of polymers which are classed as thermoplastic, elastomer-modified thermoplastic, or elastomeric resins. In this particular invention, the key attribute is related to highly flexible resins related to the latter two categories. This invention produces a variety of VDF-HFP resins, which are differentiated quite clearly from prior art with respect to the low level of crystallinity compared to resins of the otherwise same nominal monomer ratio composition produced by standard teachings. Thus, the present invention relates to a novel fluoro-thermoplastic having a unique combination of properties including excellent flexibility, low temperature processability, high clarity, solution stability and room temperature film forming capability from aqueous dispersions.

PRIOR ART

U.S. Pat. No. 3,051,677 describes batch emulsion and continuous emulsion processes for copolymerization of vinylidene fluoride and hexafluoropropylene (HFP) in the range of 30 to 70 weight percent of hexafluoropropylene monomer and 70 to 30 weight percent vinylidene fluoride monomer. The copolymers described in this reference have relatively high crystallinity as is confirmed by the properties described in the document for the products exemplified. Analogous materials from a batch process are described by Moggi, et. al. in Polymer Bulletin, Vol. 7 pp. 115–122 (1982).

U.S. Pat. No. 3,178,399 describes both batch and semi-continuous emulsion processes for preparing HFP-VDF copolymers having between 85 and 99 mole percent VDF and 1 and 15 mole percent HFP (approximately 2 to 30 weight percent HFP and 70 to 98 weight percent VDF). Once again, the copolymers produced have relatively high internal crystallinity and this fact is evidenced by the physical data provided for those copolymers actually exemplified. This patent discloses that Tensile X Reversible Elongation was increased as the overall HFP proportion decreased in the copolymer. This implies that crystallinity increases as HFP content decreases.

U.S. Pat. No. 5,093,427 describes HFP-VDF copolymers, with the other extreme crystalline melting behavior, containing from about 1 to 20 weight percent HFP wherein, based on the synthetic method described, a polymer containing significant portions of homopolymer and other copolymer portions having a high proportion of HFP in the copolymer results. Thus, compositions of the copolymers described in this reference are significantly different from the copolymers contemplated by the present invention.

Indonesian Patent Application W-980105, published Nov. 26, 1998 as number 020.295A equivalent to WO 98/38242 and to U.S. patent application Ser. No. 09/031,014, the contents of which have been included in CIP Application 09/641,015 discloses an emulsion process for producing HFP-VDF copolymers having highly homogenous distribution of the comonomers in individual claims and from chain to chain thereby having reduced extractable content and improved solution clarity over HFP-VDF copolymers prepared according to the techniques of the preceding references. These materials differ from the copolymers of the present invention because the products of this patent application are limited to lower percentages of HFP content, the solubility and solution stability properties as well as the reduced melting points are attributed to the homogeneous distribution of the comonomers and no discussion of the crystallinity or lack thereof of the polymers described and whether or not it might be related to any of the properties observed for those polymers is provided.

In Polymer, Vol. 27, p. 905 (1986) and Vol. 28, p. 224 (1987), Moggi, et al. Report synthesis of HFP-VDF copolymers and studies of various physical properties and how these properties may be correlated to certain internal structural features such as crystallinity, monomer sequencing in individual molecules and the like. The limited synthesis information indicates that the polymers formed were analogous to those prepared according to the previous references except for U.S. patent application Ser. No. 09/031,014 and the limited physical data provided is consistent with this interpretation and that the polymers described had a high degree of crystallinity.

Although it is well established in the prior art to reduce crystallinity by means of adding higher amounts of HFP to the copolymer, there is no prior art suggesting how to produce as low crystallinity as is provided by the present invention at any given nominal proportion of HFP. Thus, the copolymers disclosed herein have measurably lower crystallinity at any given HFP level than copolymers with the same nominal HFP content produced in accordance with processes enabled by any of the above listed references.

SUMMARY OF THE INVENTION

The invention provides in its first composition aspect a vinylidene fluoride, hexafluoropropylene copolymer having from about 1 to about 66 weight percent hexafluoropropylene content and having low crystallinity.

By a vinylidene fluoride hexafluoropropylene copolymer having from about 1 to about 66 weight percent hexafluoropropylene content having low crystallinity is meant that such copolymers have measurably lower crystallinity than copolymers produced according to the prior art references, which provide sufficient details for a reproducible synthesis of the materials described therein. Thus, the copolymers having 36% by weight or greater HFP content have the heats of fusion calculated from any endotherms detected in a differential scanning calorimeter (DSC) scan (described below), of about 0 J/g and for copolymers having less than 36 weight % HFP content any endotherm detected in a DSC scan as described below is at least about 1.5 J/g less than the endotherm detected for copolymers of substantially (±1.00 wt %) similar HFP content for copolymers produced according to the prior art listed above. Thus, the copolymers having from greater than 0 to 28.5 wt % HFP content have an endotherm on melting which is defined by the relationship:

$$\Delta H=56.49-1.854(\text{HFP wt \%})$$

and the copolymers having from greater than 28.5 up to less than 36 weight % HFP content have an endotherm on melting which is defined by the relationship:

$$\Delta H=54.81-1.53(\text{HFP wt \%}).$$

In addition, the copolymers of from greater than 0 to 30 wt % HFP also have lower DSC melting points at a given HFP content than any of the copolymers of the same HFP content described in any of the references cited above and the melting point for a copolymer having a particular HFP content in the greater than 0 to 30 wt % HFP range is defined by the relationship:

$$\text{Melt Temp. (°C.)}=162.16-3.192(\text{HFP wt \%}).$$

Copolymers having greater than 30 wt % HFP produced according to such prior art, as will be illustrated in the examples below, all exhibit exotherms in their DSC scans run as described below significantly greater than 0/J/g. Those having lower than 30% HFP content all have higher crystallinity as defined by higher ΔH of melting determined by DSC than those of this invention.

The DSC scan measuring the crystalline content is performed according to ASTM D 451–97 using a Perkin Elmer 7 DSC apparatus with an Intercooler II attachment. The instrument is equipped with a dry box with an $N_2$ purge through the dry box. Specimens of 9 to 10 mg are used and crimped in aluminum pans.

For samples with a low degree of crystallinity, the DSC run is begun at −50° C. followed by a 10° C./min ramp to 180° C.

For samples with an HFP content lower than 30 wt. % and, thus, a higher degree of crystallinity, the DSC run is performed in a three step cycle. The cycle is begun at −50° C. followed by a 10° C./min ramp to 180° C. with a 10 minute hold. The sample is then cooled at a rate of 10° C./min to −50° C. and then unheated at the 10° C./min rate to 180° C.

In comparison with other previously known copolymers of VF2/HFP produced by the above cited references, the reduced crystalline content of VF2/HFP at a given HFP level provides a unique combination of properties among which are those offering the following advantages:

(i) Reduced tack: allows ease of handling and better field performance;

(ii) Improved miscibility with other polymers, particularly with different esters of polyacrylates and polymethacrylates;

(iii) Lower melting temperature: allows easier manufacturing for typical molding processes;

(iv) Higher elongation at yield point: allows better performance;

(v) Lower stress at yield point: allows ease of process and manufacturing due to lower modulus;

(vi) Enhanced blendability: lower crystallinity: allows more intimate blending with other polymers because of reduction in size and in volume fraction of hard domains;

(vii) Clearer solution/haze free solution: reduction in size and in volume fraction of hard domains caused by reduced crystallinity, results in enhanced salvation of polymer chain which consequently retards the gelation of the polymer solution;

(viii) Improved optical clarity of polymer film.and plaque sheets;

(ix) Improved elastomeric properties;

(x) Longer shelf stability of solution: better solubility due to reduction of crystalline domains, results in enhanced salvation of polymer chain which consequently retards the gelation of polymer solution.

Surprisingly, as the crystallinity of the HFP copolymers decreases, it has been found that the Tg increases and still more surprisingly, It has been found that when blended with acrylic polymers, for the copolymers of the present invention, the Tg for the mixture actually increases. This is highly unexpected because normally a mixture of polymers shows lower Tg than pure polymer.

For example, two copolymers of the present invention were mixed in equal parts by weight with three different polyacrylate esters and the Tg values for each mixture determined and compared with the Tg values for identically proportioned mixture of a standard commercially available VDF/HFP copolymer which had a ΔH of melting of 37.2 (KYNAR® Flex 2750, available from ATOFINA Chemicals, Inc., Philadelphia, Pa. which contains about 15.5 wt % HFP). All three copolymers had a Tg of about −25±2° C. Copolymer sample 1 (sample 1) of the present invention had about 16.5 wt % HFP content and a ΔH of melting of 30.4 while copolymer sample 2 (sample2) of the present invention had about 14.1 wt % HFP content and a ΔH of melting of 26.7. A blend of 50 wt % polymethylmethacrylate with the KYNAR Flex had, as expected, a Tg of 24.2° C., while the analogous mixture with sample 1 had Tg of 34.3° C. and the analogous mixture with sample 2 had Tg of 40.8° C. A blend of 50 wt % polyethylmethacrylate with the KYNAR Flex had, as expected, a Tg of 17.8° C., while the analogous mixture with sample 1 had Tg of 26.3° C. and the analogous mixture with sample 2 had Tg of 30° C. A blend of 50 wt % polybutylmethacrylate with the KYNAR Flex had, as expected, a Tg of 11.7° C., while the analogous blend with sample 1 had Tg of 18.6° C. and the analogous blend with sample 2 had Tg of 23.1° C.

HFP content was alternatively determined by $^{19}$F NMR using the following methods.

In preparation for the NMR analysis, VDF/HFP copolymer samples were dissolved in a 5 mm diameter NMR tube. Samples of less than 10 wt % HFP were dissolved in DMSO-d6 at 86° C., while samples of more than 10 wt % HFP were dissolved in acetone-d6 at 50° C. An amount of copolymer, 2 to 4 mg, was placed in a tube and enough solvent was added to fill the tube to 5.5 cm (about 0.75 ml of solvent). A heating block was used to bring the samples to temperature. The samples were heated for at least one hour, until the solid was dissolved and there was no gel present, but in the case of DMSO-d6, for a time no longer than 8 hours in order to avoid degradation. Tubes were inverted to check for gel.

Spectra were acquired on either a Bruker DMX or a Varian Mercury 300 spectrometer operated at 80° C. in the case of DMSO-d6 solvent or at 50° C. in the case of acetone-d6 solvent. Specific parameters for the instruments were as follows:

|  | Bruckner DMX | Varian Mercury 300 |
| --- | --- | --- |
| $^{19}$F signal frequency | 281.9 MHz | 282.3 MHz |
| pulse width | 45° at 2.5 us | 300 at 2.5 us |
| recycle delay | 5s | 5s |
| linear prediction | not needed* | first 12 point are back predicted using 1024 points and 64 coefficients** |
| probe | 5 mm high temp H/F | 5 mm Nalorac zspec |
| $^1$H decoupling*** | yes | no |
| sweep width | 125 kHz | 100 kHz |
| acquisition time | 1.05 s | 0.3 s |

*No fluorine background observed on this instrument.
**This will be instrument dependent, depending on severity of background.
***This is inverse gated decoupling on the Bruker to Spectra were analyzed according to the signal assignments described in Pianca et al., Polymer, vol. 28, 224–230 (February 1987). As a check on the accuracy of the NMR acquisitions, the integrals of the CF3's and the CF's were compared to see if they were in a ratio of 3 to 1.

The synthetic technique described herein also provides a method for preparing a high solids small particle size latex of the copolymers of the invention. This high solids small particle latex which because of its low crystallinity offers the following applied use properties in addition to those mentioned above:

(i) lower minimum film forming temperature (MFFT) which means that the resin is able to form continuous film at lower temperatures, e.g. at room temperature where the substrate may be heat sensitive.

(ii) Longer latex stability giving a longer shelf life;

(iii) Higher concentration of polymer in latex which provides lower cost per unit weight of polymer for transportation and storage as well as better film formation characteristics;

(iv) Improved optical properties: superior to prior art in terms of clarity. It is important in many coating applications to have clear film forming resin.

Copolymers produced according to the prior art are those produced by the methods enabled by those references listed above.

The tangible embodiments of the first composition aspect of the invention are white or light colored solids having physical and chemical characteristics tending to confirm the molecular structure assigned herein.

The aforementioned chemical and physical characteristics taken together with the method of synthesis and standard analytical technique measurements, such as dynamic mechanical analytical, infrared and nuclear magnetic resonance spectroscopic and differential scanning calorimetric measurements further positively confirm the aforesaid structure for the first composition aspect of the invention.

The tangible embodiments of the first composition aspect of the invention possess the inherent applied use characteristics of being useful in formulating high performance coatings, films and foams, as encapsulants, in fiber optic applications, and as thermoplastic polymers having UV and chemical. resistance when fabricated into shaped objects including wire and cable insulation, pipes and other extruded or molded objects.

Special mention is made of embodiments of the first composition aspect of the invention wherein the hexafluoropropylene residue content is greater than 5 weight %, preferably greater than 10 weight %, still more preferably greater than 15 weight % and still more preferably greater than 30 weight %.

The invention provides in a second composition aspect, an object having at least one surface and having a coating comprising at least one embodiment of the first composition aspect of the invention on said surface.

The invention provides in a third composition aspect of the invention, a formed object comprising at least one embodiment of the first composition aspect of the invention.

The invention provides in a fourth composition aspect, an embodiment of the first composition aspect of the invention prepared by a process as described hereinafter.

DETAILED DESCRIPTION

The manner of making and using the embodiments of the invention will now be illustrated with reference to specific embodiments thereof.

The vinylidene fluoride, hexafluoropropylene copolymers of the first composition aspect of the invention are conveniently made by an emulsion polymerization process, but suspension and solution processes may also be used. In an emulsion polymerization process, a reactor is charged with deionized water, water soluble surfactant capable of emulsifying the reactor mass during polymerization and the reactor and its contents are deoxygenated while stirring. The reactor and contents are heated to the desired temperature and vinylidene fluoride, hexafluoropropylene and, optionally, chain transfer agent to control copolymer molecular weight are added. When the desired reaction pressure is reached, initiator to start and maintain the reaction is added. To obtain the VDF/HFP copolymers of the present invention, the initial charge of VDF and HFP monomers is such that the weight ratio of HFP to VDF is an exact first ratio which is from three to five times the weight ratio of HFP to VDF to be fed during the reaction. HFP and VDF are fed during the reaction in a proportion such that the total amount of HFP added over the entire course of the reaction is approximately equal to the proportionate amount of HFP desired in the final copolymer. The VDF/HFP ratios are, thus, different in the initial charge and in the continuous feed. The process uses total amounts of VDF and HFP, monomers such that the amount of HFP incorporated in the final copolymer is up to about 66 wt % of the combined total weight of the monomers.

To determine the exact first ratio for a particular reaction to provide the optimum low crystallinity at any desired HFP ratio at a desired reaction temperature and pressure, one of skill in the art will understand how to perform a few pilot scale run varying the initial HFP concentration in the desired range to select the proper exact ratio keeping other reaction conditions constant.

The reactor is a pressurized polymerization reactor preferrably a horizontal polymerization reaction equipped with a stirrer and heat control means. The temperature of the polymerization can vary depending on the characteristics of the initiator used, but it is typically between 30° and 130° C., and most conveniently it is between 50° and 120° C. The temperature is not limited to this range, however, and might be higher or lower if a high-temperature or low-temperature initiator is used. The pressure of the polymerization is typically between 20 and 80 bar, but it can be higher if the equipment permits operation at higher pressure. The pressure is most conveniently between 40 and 60 bar.

Surfactants used in the polymerization are water-soluble, halogenated surfactants, especially fluorinated surfactants such as the ammonium, substituted ammonium, quarternary ammonium, or alkali metal salts of perfluorinated or partially fluorinated alkyl carboxylates, the perfluorinated or partially fluorinated monoalkyl phosphate esters, the perfluorinated or partially fluorinated alkyl ether or polyether carboxylates, the perfluorinated or partially fluorinated alkyl sulfonates, and the perfluorinated or partially fluorinated alkyl sulfates. Some specific, but not limiting examples are the salts of the acids described in U.S. Pat. No. 2,559,752 of the formula $X(CF_2)_n COOM$, wherein X is hydrogen or fluorine, M is an alkali metal, ammonium, substituted ammonium (e.g., alkylamine of 1 to 4 carbon atoms), or quaternary ammonium ion, and n is an integer from 6 to 20; sulfuric acid esters of polyfluoroalkanols of the formula $X(CF_2)_n CH_2 OSO_3 M$, where X and M are as above; and salts of the acids of the formula $CF_3(CF_2)_n(CX_2)_m SO_3 M$, where X and M are as above; n is an integer from 3 to 7, and m is an integer from 0 to 2, such as in potassium perfluorooctyl sulfonate. The surfactant charge is from 0.05% to 2% by weight on the total monomer weight used, and most preferably the surfactant charge is from 0.1% to 1.0% by weight.

A paraffin antifoulant may be employed, if desired, although it is not preferred, and any long-chain, saturated, hydrocarbon wax or oil may be used. Reactor loadings of the paraffin may be from 0.01% to 0.3% by weight on the total monomer weight used.

After the reactor has been charged with deionized water, surfactant, and any optional paraffin antifoulant, the reactor is either purged with nitrogen or evacuated to remove oxygen. The reactor is brought to temperature, and chain-transfer agent may optionally be added. The reactor is then pressurized with a mixture of vinylidene fluoride and hexafluoropropylene.

Chain-transfer agents which may be used are well-known in the polymerization of fluorinated monomers. Alcohols, carbonate esters, ketones, carboxylate esters, and ethers are oxygenated compounds which serve as chain-transfer agents. Specific, but not limiting examples, are isopropyl alcohol, such as described in U.S. Pat. No. 4,360,652, acetone, such as described in U.S. Pat. No. 3,857,827, and ethyl acetate, as described in the published Unexamined Application (Kokai) JP 58065711. Other classes of compounds which serve as chain-transfer agents in the polymerization of fluorinated monomers are halocarbons and hydrohalocarbons such as chlorocarbons, hydrochlorocarbons, chlorofluorocarbons, and hydrochlorofluorocarbons all having 1 to 6 carbon atoms; specific, but not limiting examples are trichlorofluoromethane, such as described in U.S. Pat. No. 4,569,978, and 1,1-dichloro-2,2,2-trifluoroethane. Chain-transfer agents may be added all at once at the beginning of the reaction, in portions throughout the reaction, or continuously as the reaction progresses. The amount of chain-transfer agent and mode of addition which is used depends on the activity of the agent and the desired molecular weight characteristics of the product. The amount of chain-transfer agent used is from 0.05% to 5% by weight on the total monomer weight used, and preferably it is from 0.1 to 2% by weight.

The reactor is pressurized by adding vinylidene fluoride and hexafluoropropylene in a definite ratio (first exact ratio) such that the hexafluoropropylene ratio in the VDF/HFP mixture initially charged ranges from about 3 to about 5 times the ratio of hexafluoropropylene fed into the reactor during the reaction. The exact ratio can be selected by a series of controlled laboratory runs as described above.

The reaction can be started and maintained by the addition of any suitable initiator known for the polymerization of fluorinated monomers including inorganic peroxides, "redox" combinations of oxidizing and reducing agents, and organic peroxides. Examples of typical inorganic peroxides are the ammonium or alkali metal salts of persulfates, which have useful activity in the 65° C. to 105° C. temperature range. "Redox" systems can operate at even lower temperatures and examples include combinations of oxidants such as hydrogen peroxide, t-butyl hydroperoxide, cumene hydroperoxide, or persulfate, and reductants such as. reduced metal salts, iron (II) salts being a particular example, optionally combined with activators such as sodium formaldehyde sulfoxylate or ascorbic acid. Among the organic peroxides which can be used for the polymerization are the classes of dialkyl peroxides, peroxyesters, and peroxydicarbonates. Exemplary of dialkyl peroxides is di-t-butyl peroxide, of peroxyesters are t-butyl peroxypivalate and t-amyl peroxypivalate, and of peroxydicarbonates are di (n-propyl) peroxydicarbonate, diisopropyl peroxydicarbonate, di (sec-butyl) peroxydicarbonate, and di (2-ethylhexyl) peroxydicarbonate, and di (2-ethylhexyl) peroxydicarbonate. The use of diisopropyl peroxydicarbonate for vinylidene fluoride polymerization and copolymerization with other fluorinated monomers is taught in U.S. Pat. No. 3,475,396, and its use in making vinylidene fluoride/ hexafluoropropylene copolymers is further illustrated in U.S. Pat. No. 4,360,652. The use of di (n-propyl) peroxydicarbonate in vinylidene fluoride polymerizations is described in the Published Unexamined Application (Kokai) JP 58065711. The quantity of an initiator required for a polymerization is related to its activity and the temperature used for the polymerization. The total amount of initiator used is generally between 0.05% to 2.5% by weight on the total monomer weight used. Typically, sufficient initiator is added at the beginning to start the reaction and then additional initiator may be optionally added to maintain the polymerization at a convenient rate. The initiator may be added in pure form, in solution, in suspension, or in emulsion, depending upon the initiator chosen. As a particular example, peroxydicarbnates are conveniently added in the form of an aqueous dispersion.

As the reaction progresses, a mixture of vinylidene fluoride and hexafluoropropylene monomers is fed in a definite ratio (second effective ratio) so as to maintain reaction pressure. The proportion of hexafluoropropylene in the second effective ratio used corresponds to the monomer unit ratio desired in the final composition of the copolymer, and it can range up to 66% of the combined weight of the monomers being fed continuously throughout the reaction. The feed of vinylidene fluoride, hexafluoropropylene, and optionally initiator and chain-transfer agent is continued until the desired solid content is obtained.

Upon reaching the desired solids level in the reactor, the feed of monomers is discontinued, but the feed of initiator is continued to consume residual monomers, To minimize compositional drift at this stage, after the reactor pressure drops by 10 to 20 bar from the continuous reaction pressure, a portion of VDF is added to bring reactor pressure back up to the initial set point and initiator feed continues until the reactor pressure falls about 15 to 25 bar. After a delay time of about 10 to 20 minutes then the reactor is cooled as quickly as possible. After reaching ambient temperatures (200 to 35° C.), the unreacted monomers are vented and the latex produced by the reaction is drained into a suitable receiving vessel. To obtain dry resin, the latex is coagulated by conventional methods, the coagulum is separated and the separated coagulum may be washed. To provide powder, the coagulum is dried.

For the coagulation step, several well-known methods can be used including freezing, the addition of acids or salts, or mechanical shear with optional heating. The powder, if desired, can be further processed into pellets or other convenient resin forms.

One of skill in the art will recognize that small quantities of a third monomer known to be copolymerizable with VDF(up to about 10% by weight of the HFP level) may also be included in the above described synthesis to provide VDF based terpolymers also having low crystallinity. Such known copolymerizable monomers may, for example, be selected from among C(2–8) alkenes containing at least one fluorine atom besides HFP, an alkyl vinyl ether containing at least one fluorine atom, an aliphatic or cyclic C(3–6) ketone containing fluorinated α-α, positions and non-fluorinated C(2–4) unsaturated hydrocarbons, C(3–6) alkyl vinyl ethers or C(4–6) vinyl esters.

Among the applied uses for the resin is in paint bases for coatings. It will be understood by one of skill in the art that such paint bases will conventionally include a portion of an acrylic resin and that formation of paints varnishes and related coating materials and coatings therefrom may be accomplished by standard methods well known to those of skill in the art The following examples further illustrate the best mode contemplated by the inventors for the practice of their invention and should be considered as illustrative and not in limitation thereof.

EXAMPLES 1 THROUGH 9

Preparation of and Comparison of the Internal Crystallinity of VDF/HFP Copolymers Copolymers of VDF and HFP were prepared by the method described above (Examples 1,7,8, Application Examples), by the method described in U.S. Pat. No. 3,051,677 (Examples 2,3,6, Comparative Examples), U.S. Pat. No. 3,178,399 (Examples 4,5, Comparative Examples). Table I shows the weight % HFP fed initially and during the steady state reaction (S.S.), the method employed to isolate the resin from the reaction latex (acid coagulation or not) and the internal crystallinity found by DSC. Also included in Table 1 is a comparison of the internal crystallinity found in a commercially obtained sample of the fluoroelastoner Viton A (Example 9).

The crystalline content is an important feature in semi-crystalline polymers. It is known that the crystalline content in copolymers of VF2/HFP is related to the HFP content of final product. The measured crystalline content ($\Delta H$ of melting by DSC) of the VF2/HPF copolymer examples are tabulated in Table 1. Inspection of Table 1 indicates that the copolymers of the present invention have zero crystallinity at high HFP content (30 to 60%) whereas the copolymers of the prior art contain at least some crystallinity.

TABLE 1

| Example # | Polymer Type | feeding rate initial HFP wt % | Steady State HFP wt % | Acid Coagulation HCl. wt % | DSC $\Delta$ H (melt) J/g |
|---|---|---|---|---|---|
| 1 | Application example | 66.7 | 35.8 | — | 0 |
| 2 | Comparative example | 56.6 | 38.3 | 1.5 | 0.485 |
| 3 | Comparative example | 50.0 | 36.3 | 0.8 | 5.043 |
| 4 | Comparative example | 39.4 | 38.1 | 0.9 | 6.681 |
| 5 | Comparative example | 49.8 | 45.8 | 0.9 | 0.889 |
| 6 | Comparative example | 50.0 | 45.0 | 1.1 | 1.107 |
| 7 | Application example | 66.8 | 45.5 | 1.9 | 0 |
| 8 | Application example | 75.1 | 45.9 | 1.9 | 0 |
| 9 | Viton A Commercial grade | 40% (nominal content in polymer) | — | — | 0.286 |

EXAMPLES 10 THROUGH 21

Additional examples of VDF/HFP copolymers prepared by the method of this application (Examples 14, 18, 20, 21), by the method of U.S. 3,178,399 (Examples 11, 16) by the method of U.S. 5,093,247 (Examples 10, 12, 15, 19) and of Indonesian Patent Application W 980105 (Examples 13, 17). The HFP content, the melting points and the $\Delta H$ of melting are tabulated in Table 2.

When copolymers of this invention are synthesized with HFP level below 30%, the copolymers are semi-crystalline.

The crystalline and peak melting temperatures of VF2/HFP copolymer examples with HFP content with less than 30% are presented in Table 2, Inspection of Table 2 shows that at the same HFP level, the copolymers of the present invention have lower crystallinity that the copolymers prepared according to the above prior art. The difference between crystalline content of copolymers of this innovation and those copolymers of prior art at the same HFP content, is indicative of the differences between the molecular structures of these copolymers.

| Example No. | HFP wt % | initial/ steady state HFP | Tm° C. | ΔH (melt) J/g |
| --- | --- | --- | --- | --- |
| 10 (comp) | 10.3 | 0.53 | 138.4 | 48.8 |
| 11 (comp) | 11.3 | 1.06 | 134.0 | 35.4 |
| 12 (comp) | 14.1 | 0.52 | 131.4 | 28.7 |
| 13 (comp) | 13.4 | 2.53 | 123.0 | 29.7 |
| 14 (Appln) | 14.2 | 3.59 | 118.8 | 25.7 |
| 15 (comp) | 15.6 | 0.00 | 139.2 | 28.2 |
| 16 (comp) | 15.4 | 1.06 | 119.8 | 26.4 |
| 17 (comp) | 16.5 | 2.20 | 111.5 | 25.1 |
| 18 (Appln) | 15.4 | 5.00 | 112.8 | 23.5 |
| 19 (comp) | 17.4 | 2.09 | 107.9 | 24.5 |
| 20 (Appln) | 20.9 | 3.37 | 91.5 | 18.5 |
| 21 (Appln) | 25.6 | 6.77 | 83.0 | 9.5 |

Figure 2:
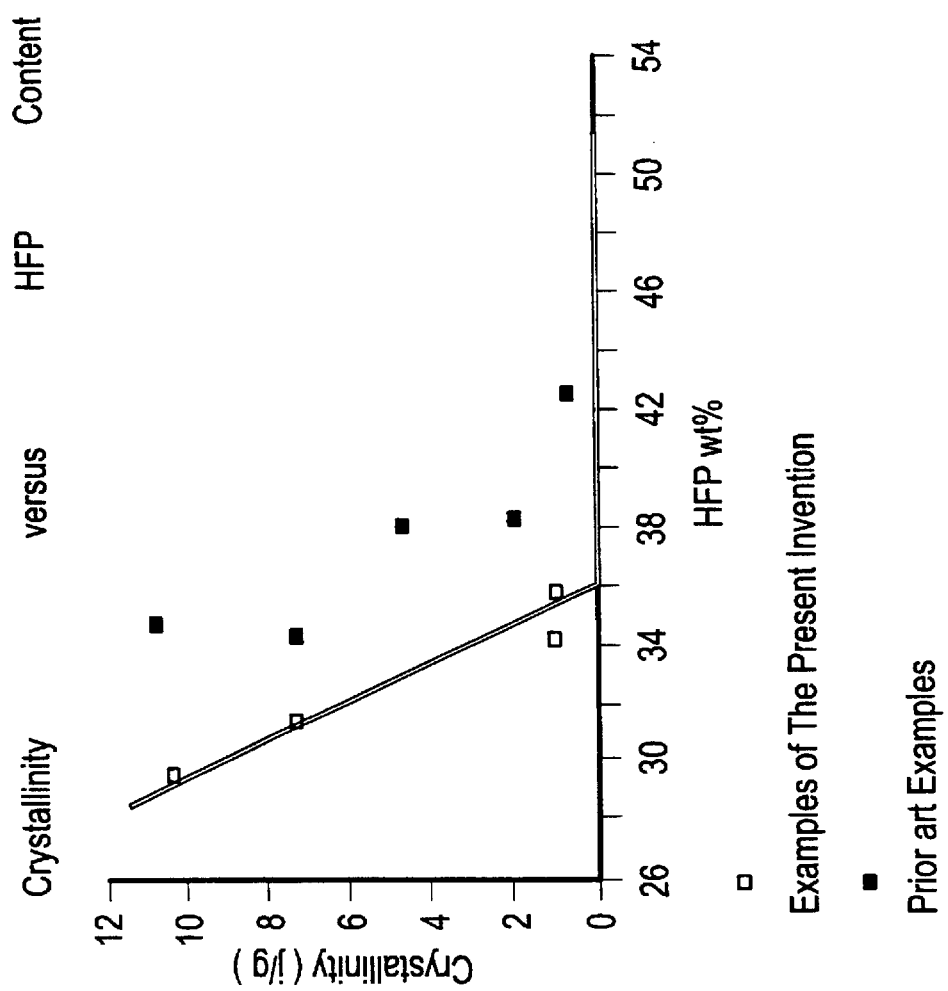
Figure 3:
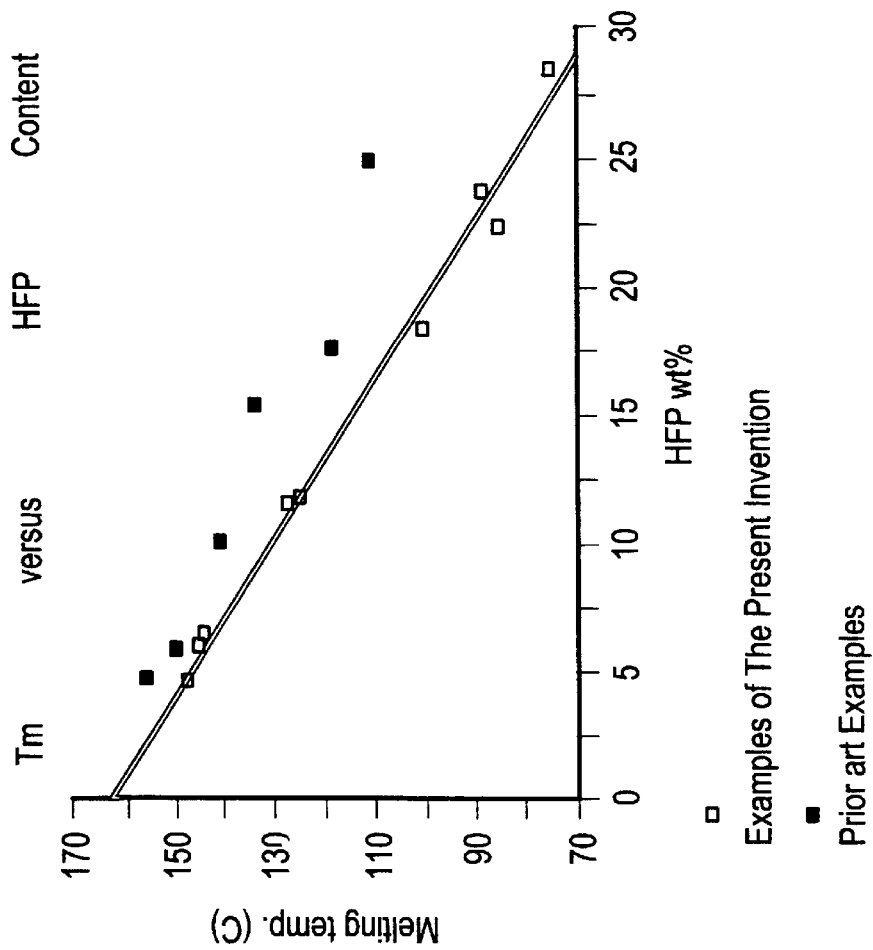

Brief description of the figures: FIGS. 1, 2 and 3 respectively illustrate the differences in Heat of Fushion, Crystallinity and Melting Temperature for the present polymers versus the prior art.

The subject matter which applicants regard as their invention is particularly pointed out and distinctly claimed as follows:

We claim:

1. A vinylidene fluoride, hexafluoropropylene copolymer having from about 1 to about 66 weight percent hexafluoropropylene content and having low crystallinity, said copolymer having a DSC melting point defined by the relationship:

Melt Temp. (° C.)=162.16−3.192(HFP wt %)

when the copolymer has from 1 to 30 weight % hexafluoropropylene, said copolymer having an endotherm on melting defined by the relationship:

$\Delta H$=54.81−1.53(HFP wt %)

when the copolymer has from greater than 30 up to less than 36 weight % hexafluoropropylene, and said copolymer having a ΔH of melting of zero when the copolymer has from 36 to 66 weight % hexafluoropropylene.

2. A vinylidene fluoride hexafluoropropylene copolymer as defined in claim 1 having from greater than 15 weight % hexafluoropropylene to about 66 weight percent hexafluoropropylene content.

3. A vinylidene fluoride, hexafluoropropylene copolymer as defined in claim 1 having greater than about 36 weight % hexafluoropropylene content and zero crystallinity.

4. A vinylidene fluoride, hexafluoropropylene copolymer as defined in claim 1 prepared by a process comprising:

a) charging to a reactor vinylidene fluoride and hexafluoropropylene in a first exact ratio, water, a water soluble surfactant and an initiator to start polymerization;

b) feeding vinylidene fluoride and hexafluoropropylene in a second effective ratio until the desired solid content in the reactor is obtained; and c) obtaining the desired vinylidene fluoride hexafluoropropylene copolymer.

* * * * *